(12) United States Patent
Ono et al.

(10) Patent No.: US 11,489,349 B2
(45) Date of Patent: Nov. 1, 2022

(54) BATTERY CONTROL UNIT AND BATTERY SYSTEM

(71) Applicant: YAZAKI CORPORATION, Tokyo (JP)

(72) Inventors: Chihiro Ono, Susono (JP); Takahiro Syouda, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 186 days.

(21) Appl. No.: 17/155,047

(22) Filed: Jan. 21, 2021

(65) Prior Publication Data

US 2021/0234380 A1 Jul. 29, 2021

(30) Foreign Application Priority Data

Jan. 28, 2020 (JP) .............................. JP2020-011532

(51) Int. Cl.
| | |
|---|---|
| *H02J 7/00* | (2006.01) |
| *H01M 50/502* | (2021.01) |
| *H01M 10/44* | (2006.01) |
| *H01M 10/48* | (2006.01) |
| *H02J 7/02* | (2016.01) |

(52) U.S. Cl.
CPC ......... *H02J 7/0024* (2013.01); *H01M 10/441* (2013.01); *H01M 10/482* (2013.01); *H01M 50/502* (2021.01); *H02J 7/0047* (2013.01); *H02J 7/02* (2013.01)

(58) Field of Classification Search
None
See application file for complete search history.

(56) References Cited

U.S. PATENT DOCUMENTS

2018/0326861 A1\* 11/2018 Poirier .................... B60L 58/15

FOREIGN PATENT DOCUMENTS

| | | |
|---|---|---|
| CN | 106356927 A | 1/2017 |
| JP | 2006-203998 A | 8/2006 |
| JP | 2013-31249 A | 2/2013 |
| JP | 2013-90525 A | 5/2013 |
| WO | 2017/114802 A1 | 7/2017 |

\* cited by examiner

*Primary Examiner* — Robert Grant
(74) *Attorney, Agent, or Firm* — Kenealy Vaidya LLP

(57) ABSTRACT

A battery control unit includes a plurality of switching units, a first controller, and a plurality of bidirectional voltage converters including a ground terminal, a first, and a second input-output terminal. Each of a plurality of battery packs connected in parallel to each other includes a plurality of batteries connected in series with each other. The plurality of switching units are disposed corresponding to the plurality of batteries respectively, and are configured to switch between a connected state where a corresponding battery among the plurality of batteries is connected in series with non-corresponding battery among the plurality of batteries and a non-connected state where the corresponding battery is disconnected from series connection with the non-corresponding battery.

8 Claims, 5 Drawing Sheets

BATTERY CONTROL UNIT AND BATTERY SYSTEM

CROSS REFERENCE TO RELATED APPLICATIONS

This application claims priority from Japanese Patent Application No. 2020-011532 filed on Jan. 28, 2020, the entire contents of which are incorporated herein by reference.

BACKGROUND OF THE INVENTION

Field of the Invention

The present invention relates to a battery control unit and a battery system.

Description of Related Art

There is a battery system configured by connecting a plurality of batteries in series. Deterioration of the plurality of batteries varies due to, for example, a variation in manufacturing or a variation in an operation environment. For example, a battery close to a heat source deteriorates rapidly, while a battery away from the heat source deteriorates slowly.

Therefore, a battery that is deteriorated during charge and discharge reaches charge and discharge termination voltages first. In this case, even when there is remaining capacity in other batteries, the charge and the discharge must be stopped. Therefore, a system that bypasses a battery that has reached the charge termination voltage, disconnects the battery from charging, and continues the charge of a battery that has not reached the charge termination voltage is proposed (Patent Literature 1). Similarly, during the discharge, a battery system that bypasses a battery that has reached the discharge termination voltage, disconnects the battery from discharging, and continues the discharge of a battery that has not reached the discharge termination voltage can be considered.

However, in the battery system in the related art described above, a power supply to a load is stopped every time a bypass state of the battery is switched during the discharge. A plurality of battery packs including a plurality of batteries connected in parallel can be considered so that even if one of the plurality of battery packs is bypass-switched, a rest can maintain the power supply to the load.
[Patent Literature 1] JP-A-2013-31249

However, in the related art described above, since the battery is used as a bypass, when the battery packs are connected in parallel, a large difference is generated in a total voltage between the battery packs. Therefore, only a battery pack having the highest total voltage can be discharged. Only a battery pack having the lowest total voltage can be charged, and efficiency of charging and discharging is not good.

SUMMARY

One or more embodiments provide a battery control unit and a battery system that improve efficiency of charging or discharging.

In an aspect, a battery control unit includes a plurality of switching units, a first controller, and a plurality of bidirectional voltage converters including a ground terminal, a first, and a second input-output terminal. Each of a plurality of battery packs connected in parallel to each other includes a plurality of batteries connected in series with each other. The plurality of switching units are disposed corresponding to the plurality of batteries respectively, and are configured to switch between a connected state where a corresponding battery among the plurality of batteries is connected in series with non-corresponding battery among the plurality of batteries and a non-connected state where the corresponding battery is disconnected from series connection with the non-corresponding battery. The first controller is configured to control the plurality of switching units corresponding to the battery, which is determined to reach a termination voltage during charge or discharge, to the non-connected state. The plurality of bidirectional voltage converters are configured to convert a first input voltage input between the first input-output terminal and the ground terminal and output a first converted voltage from between the second input-output terminal and the ground terminal, and convert a second input voltage input between the second input-output terminal and the ground terminal and output a second converted voltage from between the first input-output terminal and the ground terminal. The plurality of bidirectional voltage converters are disposed corresponding to the plurality of battery packs, and the first input-output terminals are connected to one end of a corresponding battery pack and the ground terminals are connected to another end of the corresponding battery pack, respectively. The one ends of the plurality of battery packs are connected to each other via the first input-output terminals and the second input-output terminals.

In an aspect, battery control unit includes a plurality of switching units, a first controller, and a plurality of voltage converters including a ground terminal, an input terminal, and an output terminal. The plurality of switching units are disposed corresponding to the plurality of batteries respectively, and are configured to switch between a connected state where a corresponding battery among the plurality of batteries is connected in series with non-corresponding battery and a non-connected state where the corresponding battery is disconnected from series connection with the non-corresponding battery. The first controller is configured to control the plurality of switching units corresponding to the battery, which is determined to reach a termination voltage during charge or discharge, to the non-connected state. The plurality of voltage converters are configured to convert a input voltage input between the input terminal and the ground terminal and output a converted voltage from between the output terminal and the ground terminal. The voltage converters are disposed corresponding to the plurality of battery packs, and the input terminals or the output terminals are connected to one ends of a corresponding battery pack, and the ground terminals are connected to another end of the corresponding battery pack, respectively. One ends of the plurality of battery packs are connected to each other via input terminals and output terminals.

DETAILED DESCRIPTION

A specific embodiment according to the present invention will be described below with reference to the drawings.

Figure 1:
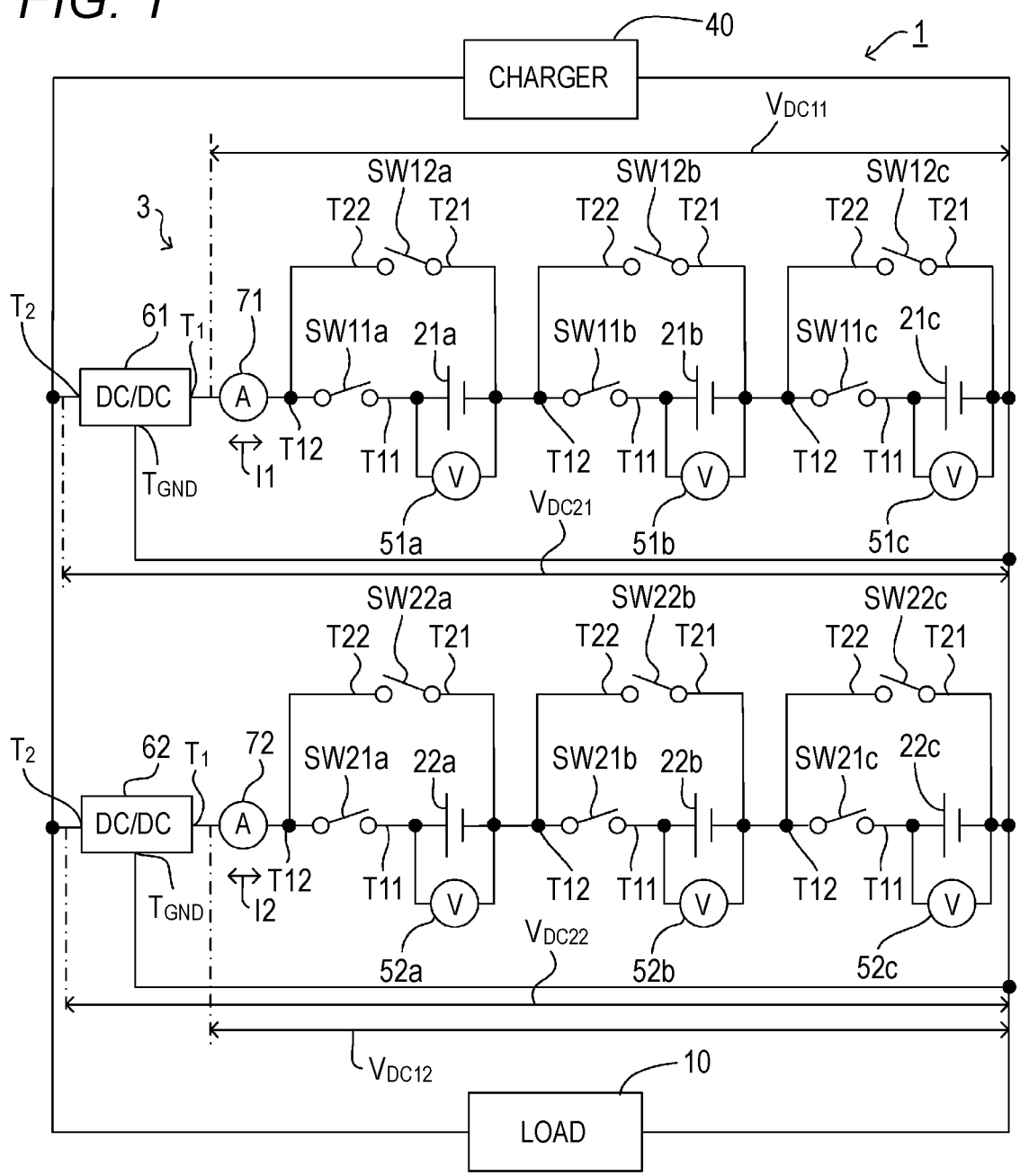
FIG. 1 is a circuit diagram showing a battery system.

A battery system 1 shown in FIG. 1 is, for example, a device that supplies power obtained by reusing a deteriorated battery.

As shown in FIG. 1, the battery system 1 includes a plurality of battery packs 21 and 22 and a battery control unit 3. The plurality of battery packs 21 and 22 are connected in parallel to each other, and are connected to a load 10 and a charger 40 (power source). In the present embodiment, in order to simplify a description, an example in which two battery packs 21 and 22 are connected in parallel will be described, but the present invention is not limited thereto. The number of the battery packs 21 and 22 may be plural, and may be three or more.

The battery pack 21 includes a plurality of batteries 21a to 21c. The battery pack 22 includes a plurality of batteries 22a to 22c. In the present embodiment, in order to simplify a description, an example in which three batteries 21a to 21c, 22a to 22c are connected in series will be described, but the present invention is not limited thereto. The number of the batteries 21a to 21c, 22a to 22c may be plural, and may be two or four or more. Each of the plurality of batteries 21a to 21c, 22a to 22c is a chargeable and dischargeable storage battery, and may include one cell, or may include a plurality of cells.

The battery control unit 3 includes a plurality of switching units 41a to 41c, 42a to 42c, a plurality of voltage measurement units 51a to 51c, 52a to 52c, a plurality of bidirectional DC/DC converters 61 and 62 (bidirectional voltage converter), a plurality of current measurement units 71 and 72, and a controller 8.

The plurality of switching units 41a to 41c are provided corresponding to the plurality of batteries 21a to 21c, respectively. The plurality of switching units 42a to 42c are provided corresponding to the plurality of batteries 22a to 22c, respectively. The plurality of switching units 41a to 41c, 42a to 42c have the same configuration.

The switching units 41a to 41c, 42a to 42c are switchable between a connected state where corresponding batteries 21a to 21c, 22a to 22c are connected in series with other batteries 21a to 21c, 22a to 22c and a non-connected state where the corresponding batteries 21a to 21c, 22a to 22c are disconnected from series connection with other batteries 21a to 21c, 22a to 22c. Specifically, the batteries 21a to 21c, 22a to 22c switched to the connected state by the switching units 41a to 41c, 42a to 42c are connected in series and used as a power source. On the other hand, the batteries 21a to 21c, 22a to 22c switched to the non-connected state by the switching units 41a to 41c, 42a to 42c are disconnected from the batteries 21a to 21c, 22a to 22c in the connected state and are not used as the power source.

The switching unit 41a is configured with a first switch SW11a connected in series with the battery 21a, and a second switch SW12a connected in parallel to the battery 21a and the first switch SW11a. One end T11 of the first switch SW11a is connected to one electrode (for example, a positive electrode) of the battery 21a. One end T21 of the second switch SW12a is connected to the other electrode (for example, a negative electrode) of the battery 21a, and the other end T22 of the second switch SW12a is connected to the other end T12 of the first switch SW11a. Since the switching units 41b and 41c can be described by replacing "a" in the above description of the switching unit 41a with "b" and "c", a detailed description thereof is omitted.

The switching unit 42a is configured with a first switch SW21a connected in series with the battery 22a, and a second switch SW22a connected in parallel to the battery 22a and the first switch SW21a. One end T11 of the first switch SW21a is connected to one electrode (for example, a positive electrode) of the battery 22a. One end T21 of the second switch SW22a is connected to the other electrode (for example, a negative electrode) of the battery 22a, and the other end T22 of the second switch SW22a is connected to the other end T12 of the first switch SW21a. Since the switching units 42b and 42c can be described by replacing "a" in the above description of the switching unit 42a with "b" and "c", a detailed description thereof is omitted.

The other end T12 of a first switch SW11b is connected to the negative electrode of the battery 21a, and the other end T12 of a first switch SW11c is connected to a negative electrode of the battery 21b. That is, the first switch SW11b is connected between the battery 21a and the battery 21b that are adjacent to each other, and the first switch SW11c is connected between the battery 21b and the battery 21c that are adjacent to each other.

The other end T12 of a first switch SW21b is connected to the negative electrode of the battery 22a, and the other end T12 of a first switch SW21c is connected to a negative electrode of the battery 22b. That is, the first switch SW21b is connected between the battery 22a and the battery 22b that are adjacent to each other, and the first switch SW21c is connected between the battery 22b and the battery 22c that are adjacent to each other.

According to the above configuration, when the second switches SW12a to SW12c, SW22a to SW22c are turned off and the first switches SW11a to SW11c, SW21a to SW21c are turned on, the corresponding batteries 21a to 21c. 22a to 22c are in the connected state. In addition, when the first switches SW11a to SW11c, SW21a to SW21c are turned off, the corresponding batteries 21a to 21c, 22a to 22c are in the non-connected state. At this time, when the second switches SW12a to SW12c, SW22a to SW22c are turned on, a bypass path is formed, and only the batteries 21a to 21c. 22a to 22c in the connected state are connected in series.

The plurality of voltage measurement units 51a to 51c, 52a to 52c are provided corresponding to the plurality of batteries 21a to 21c, 22a to 22c. The plurality of voltage measurement units 51a to 51c, 52a to 52c measure voltages across the corresponding batteries 21a to 21c, 22a to 22c and output measurement results thereof to the controller 8 to be described later.

The plurality of bidirectional DC/DC converters 61 and 62 are provided corresponding to the plurality of battery packs 21 and 22, respectively. Each of the bidirectional DC/DC converters 61 and 62 includes a first input-output terminal $T_1$, a second input-output terminal $T_2$, and a ground terminal $T_{GND}$. The bidirectional DC/DC converters 61 and 62 boost and lower (convert) an input voltage (DC) input between the ground terminal $T_{GND}$ and the first input-output terminal $T_1$, and output the converted voltage as outputs $V_{DC21}$ and $V_{DC22}$ (DC) from between the ground terminal $T_{GND}$ and the second input-output terminal $T_2$. The bidirectional DC/DC converters 61 and 62 boost and lower (convert) an input voltage (DC) input between the ground terminal $T_{GND}$ and the second input-output terminal $T_2$, and output the converted voltage as outputs $V_{DC11}$ and $V_{DC12}$ (DC) from between the ground terminal $T_{GND}$ and the first input-output terminal $T_1$.

The ground terminals $T_{GND}$ of the bidirectional DC/DC converters 61 and 62 above are connected to negative electrodes of the battery packs 21 and 22, and the first input-output terminals $T_1$ are connected to positive electrodes of the battery packs 21 and 22. That is, a total voltage of the battery packs 21 and 22 is input as an input voltage to the first input-output terminals $T_1$ of the bidirectional DC/DC converters 61 and 62. The total voltage of the battery packs 21 and 22 is a sum of voltages across the batteries 21a to 21c, 22a to 22c that are in the connected state in the battery packs 21 and 22. A voltage from the charger 40 is input as an input voltage to the second input-output terminals $T_2$ of the bidirectional DC/DC converters 61 and 62. The positive electrodes of the battery packs 21 and 22 are connected to each other, and are connected to the load 10 or the charger 40 via the input-output terminals $T_1$ and the second input-output terminals $T_2$ of the bidirectional DC/DC converters 61 and 62. According to the above configuration, the bidirectional DC/DC converters 61 and 62 boost and lower the total voltage of the battery packs 21 and 22 during discharge, and output the voltage to the load 10. The bidirectional DC/DC converters 61 and 62 boost and lower a voltage from the charger 40 during charge, and output the voltage to the battery packs 21 and 22.

The bidirectional DC/DC converters 61 and 62 are connected to the controller 8, and can control the outputs $V_{DC11}$, $V_{DC12}$, $V_{DC21}$, and $V_{DC22}$ of the bidirectional DC/DC converters 61 and 62 by the controller 8.

The plurality of current measurement units 71 and 72 are provided corresponding to the plurality of battery packs 21 and 22, respectively. The current measurement unit 71 is connected in series with the battery pack 21, and measures a current I1 (charge current or discharge current) flowing through the battery pack 21. The current measurement unit 72 is connected in series with the battery pack 22, and measures a current I2 flowing through the battery pack 22.

The controller 8 includes a well-known CPU, ROM, and RAM, and controls the entire battery system 1. The controller 8 functions as a first controller, and controls ON/OFF of the first switches SW11a to SW11c, the SW21a to SW21c, the second switches SW12a to SW12c, SW22a to SW22c based on a voltage across each of the batteries 21a to 21c, 22a to 22c. More specifically, the controller 8 bypasses the batteries 21a to 21c, 22a to 22c that reach a discharge termination voltage or a charge termination voltage during the discharge or the charge as a non-connected state.

During the charge, the controller 8 controls the DC/DC converters 61 and 62 as described below. First, the controller 8 first controls the outputs $V_{DC11}$ and $V_{DC12}$ of the DC/DC converters 61 and 62 based on charging states of the battery packs 21 and 22. As the charging states of the battery packs 21 and 22, the total voltage obtained from the voltage across each of the batteries 21a to 22c, 22a to 22c can be used. The total voltage is the sum of the voltages across the batteries 21a to 21c, 22a to 22c that are in the connected state in the battery packs 21 and 22, and is a voltage corresponding to the charging state. The controller 8 controls the DC/DC converter 61 so that the output $V_{DC11}$ becomes a voltage slightly higher than the total voltage of the battery pack 21. Similarly, the controller 8 controls the DC/DC converter 62 so that the output $V_{DC12}$ becomes a voltage slightly higher than the total voltage of the battery pack 22. Accordingly, both of the battery packs 21 and 22 start charging at the same time.

Thereafter, the controller 8 controls the outputs $V_{DC11}$ and $V_{DC12}$ of the DC/DC converters 61 and 62 based on the charge currents I1 and I2 measured by the current measurement units 71 and 72. More specifically, the controller 8 adjusts the outputs $V_{DC11}$ and $V_{DC12}$ of the bidirectional DC/DC converters 61 and 62 so that the charge currents I1 and I2 within a predetermined range (equal to or less than an allowable maximum input current and equal to or larger than a lower limit input current) flow through the battery packs 21 and 22. Specifically, when only the charge current I1 smaller than the lower limit input current flows through the battery pack 21, the controller 8 raises the output $V_{DC11}$ until the charge current I1 equal to or larger than the lower limit input current flows, and when the charge current I1 larger than the allowable maximum input current flows, the controller 8 decreases the output $V_{DC11}$. Similarly, when only the charge current I2 smaller than the lower limit input current flows through the battery pack 22, the controller 8 raises the output $V_{DC12}$ until the charge current I2 equal to or larger than the lower limit input current flows, and when the charge current I2 larger than the allowable maximum input current flows, the controller 8 decreases the output $V_{DC12}$.

Accordingly, the battery packs 21 and 22 having different total voltages can be charged at the same time.

During the discharge, the controller 8 controls the DC/DC converters 61 and 62 as described below. First, the controller 8 controls the outputs $V_{DC21}$ and $V_{DC22}$ of the bidirectional DC/DC converters 61 and 62 to a predetermined constant value in accordance with the load 10. Accordingly, since the outputs $V_{DC21}$ and $V_{DC22}$ are controlled to be equivalent, when the battery packs 21 and 22 are connected to the load 10, the battery packs 21 and 22 can be discharged at the same time, and the efficiency of the discharge can be improved.

When the discharge progresses under a constant load, the total voltage of the battery packs 21 and 22 reduces. Therefore, the DC/DC converters 61 and 62 try to keep the outputs $V_{DC21}$ and $V_{DC22}$ at a constant value, so that the discharge currents I1 and I2 increase as the discharge progresses. When the discharge currents I1 and I2 of the battery packs 21 and 22 exceed an allowable current, the controller 8 controls reductions of the DC/DC converters 61 and 62 so as to reduce the outputs $V_{DC21}$ and $V_{DC22}$. In the DC/DC converters 61 and 62 that are controlled to reduce, the outputs $V_{DC21}$ and $V_{DC22}$ decrease, so that the discharge currents I1 and I2 also reduce. Accordingly, it is possible to prevent the discharge currents I1 and I2 from exceeding the allowable current. Since the outputs $V_{DC21}$ and $V_{DC22}$ are connected to each other, even if one of the outputs $V_{DC21}$ and $V_{DC22}$ is controlled to reduce, actual outputs $V_{DC21}$ and $V_{DC22}$ have the same constant value as the other one that is not controlled to reduce.

The allowable current is determined for each of the battery packs 21 and 22. More specifically, a relationship between a battery state such as a battery temperature, a degradation state (for example, internal resistor), a charging state (for example, an open circuit voltage), and the allowable current is stored in advance in a memory or the like. The allowable current of the battery pack 21 is set to the minimum value among each allowable currents of the batteries 21a to 21c in the connected state. Similarly, the allowable current of the battery pack 22 is set to the minimum value among each allowable currents of the battery states of the batteries 22a to 22c in the connected state.

According to the battery system 1 configured as described above, since the bidirectional DC/DC converters 61 and 62 are electrically converted from electricity to magnetism, and from magnetism to electricity, electrical insulation is possible for each battery pack 21 and 22.

Figure 2:
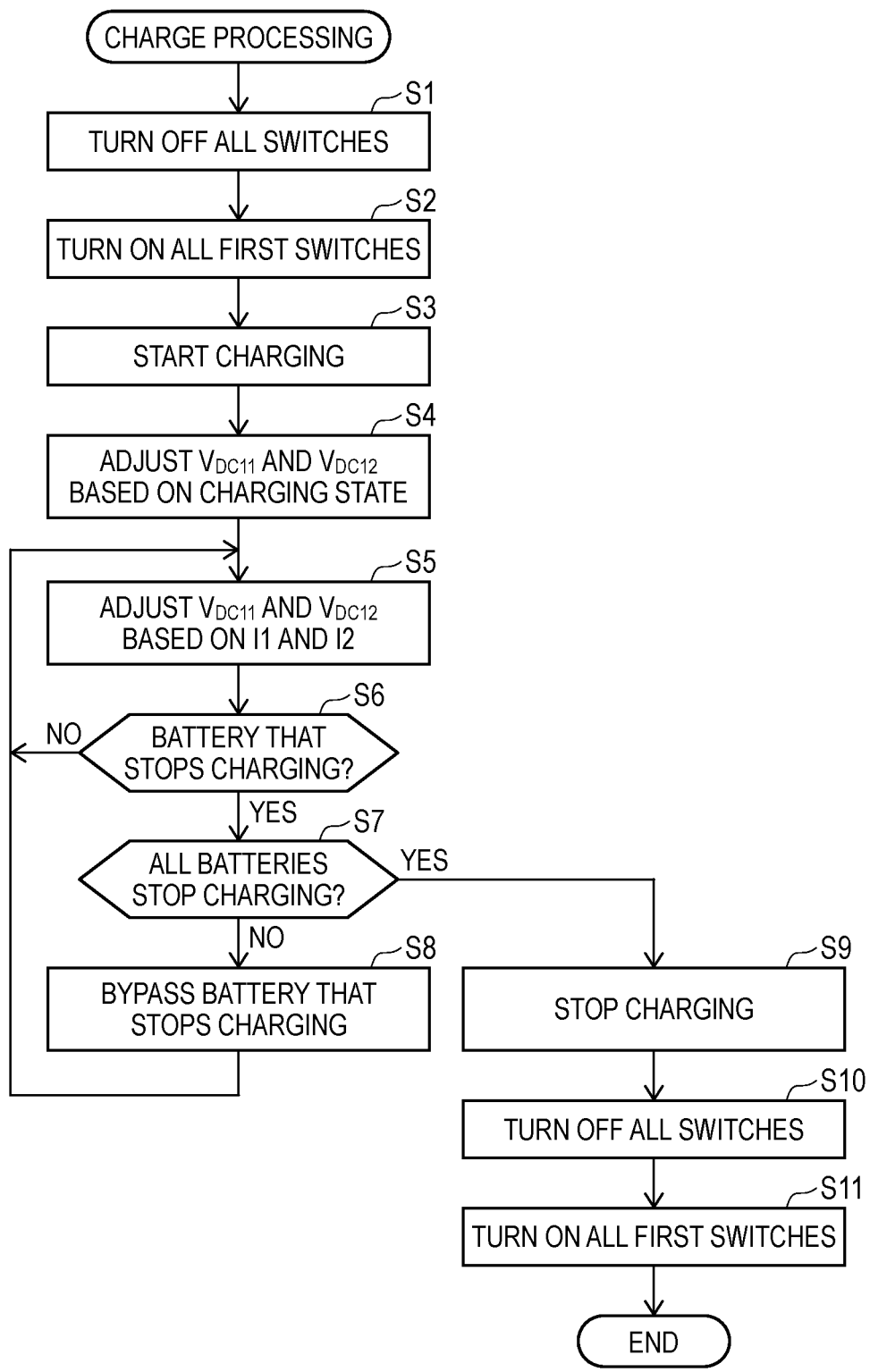
FIG. 2 is a flowchart showing a charge processing procedure of a controller shown in FIG. 1.

Next, an operation during the charge of the battery system 1 described in the above outline will be described with reference to FIG. 2. FIG. 2 is a flowchart showing a charge processing procedure of the controller 8 shown in FIG. 1. The controller 8 executes a charge processing when a charge signal is received from an external system or the like. First, the controller 8 turns off all the first switches SW11a to SW11c, SW21a to SW21c, and all the second switches SW12a to SW12c, SW22a to SW22c (step S1). Thereafter, the controller 8 turns on all the first switches SW11a to SW11c, SW21a to SW21c (step S2). Next, the controller 8 connects the charger 40 to the battery packs 21 and 22 to start charging (step S3).

Next, the controller 8 controls the outputs $V_{DC11}$ and $V_{DC12}$ of the DC/DC converters 61 and 62 so as to have a value corresponding to the charging states of the battery packs 21 and 22 as described above (step S4).

Thereafter, the controller 8 acquires the charge currents I1 and I2 flowing through the battery packs 21 and 22 measured by the current measurement units 71 and 72, and controls the outputs $V_{DC11}$ and $V_{DC12}$ so that the acquired charge currents I1 and I2 fall within a predetermined range (step S5).

Thereafter, the controller 8 acquire voltage values of the batteries 21a to 21c, 22a to 22c measured by the voltage measurement units 51a to 51c, 52a to 52c, and determines whether the batteries 21a to 21c, 22a to 22c reach the charge termination voltage (step S6). If the batteries 21a to 21c, 22a to 22c that reach the charge termination voltage are not present (N in step S6), the controller 8 returns to step S5.

On the other hand, if a battery among the batteries 21a to 21c, 22a to 22c that reaches the charge termination voltage is present (Y in step S6), the controller 8 determines whether all the batteries 21a to 21c, 22a to 22c reach the charge termination voltage (step S7). If all the batteries 21a to 21c, 22a to 22c do not reach the charge termination voltage (N in step S7), the controller 8 turns off the first switches SW11a to SW11c, SW21a to SW21c corresponding to the batteries 21a to 21c, 22a to 22c determined to have reached the charge termination voltage, turns on the second switches SW12a to SW12c, SW22a to SW22c, bypasses the batteries 21a to 21c, 22a to 22c that reach the charge termination voltage (step S8), and then returns to step S5.

If all the batteries reach the charge termination voltage (Y in step S7), the controller 8 disconnects the charger 40 and stops charging (step S9), and turns off all the first switches SW11a to SW11c, SW21a to SW21c, and all the second switches SW12a to SW12c, SW22a to SW22c (step S10). Thereafter, the controller 8 turns on all the first switches SW11a to SW11c. SW21a to SW21c (step S1), and then ends the charge processing.

Figure 3:
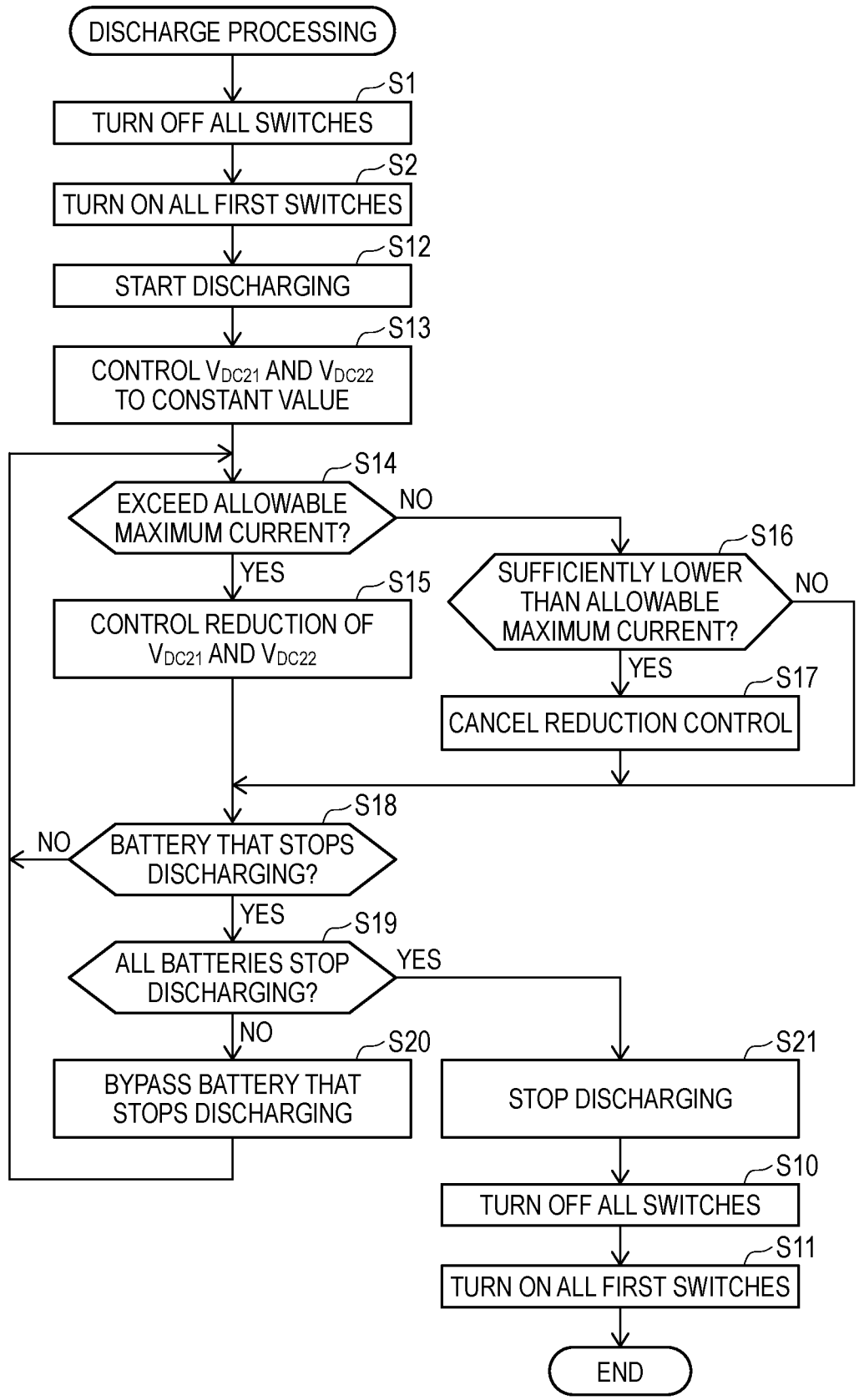
FIG. 3 is a flowchart showing a discharge processing procedure of the controller shown in FIG. 1.

Next, an operation during the discharge of the battery system 1 described in the above outline will be described with reference to FIG. 3. FIG. 3 is a flowchart showing a discharge processing procedure of the controller 8 shown in FIG. 1. In FIG. 3, the same steps as those in FIG. 2 described above are denoted by the same reference signs, and a detailed description thereof is omitted. The controller 8 executes a discharge processing when a discharge signal is received from an external system or the like. First, the controller 8 executes steps S1 and S2 similarly to the charge processing.

Next, the controller 8 connects the load 10 to the battery packs 21 and 22 to start discharging (step S12). Thereafter, the controller 8 controls the outputs $V_{DC21}$ and $V_{DC22}$ of the bidirectional DC/DC converters 61 and 62 to a predetermined constant value equal to each other (step S13). Next, the controller 8 acquires the currents flowing through the battery packs 21 and 22 measured by the current measurement units 71 and 72, and compares the currents with a predetermined allowable maximum current (threshold value)(step S14).

If a current flows exceeding the allowable maximum current among the battery packs 21 and 22 (Y in step S14), the controller 8 decreases the outputs $V_{DC21}$ and $V_{DC22}$ of the DC/DC converters 61 and 62 corresponding to the battery packs 21 and 22 exceeding the allowable maximum current (step S15), and proceeds to step S18. In step S15, the controller 8 decreases the outputs $V_{DC21}$ and $V_{DC22}$ until the discharge currents I1 and I2 flowing through the battery packs 21 and 22 fall within the allowable maximum current.

If a sufficiently low current flows with respect to the allowable maximum current among the battery packs 21 and 22 (Y in step S16), the controller 8 proceeds to step S17. In step S17, the controller 8 cancels the control of decreasing the outputs $V_{DC21}$ and $V_{DC22}$ to the battery packs 21 and 22 in which a sufficiently low current flows, and returns to the constant value set in step S13, and then proceeds to step S18. In step S16, determination as to whether the current is sufficiently low can be considered based on whether the current flowing through the battery packs 21 and 22 is equal to or less than a set current value less than the allowable maximum current.

If none of the battery packs 21 and 22 exceed the allowable maximum current, and none are sufficiently low (N in step S16), the controller 8 immediately proceeds to step S18.

The controller 8 in step S18 acquires voltages of the batteries 21a to 21c, 22a to 22c measured by the voltage measurement units 51a to 51c. 52a to 52c, and determines whether the batteries 21a to 21c, 22a to 22c reach the discharge termination voltage. If the batteries 21a to 21c, 22a to 22c that reach the discharge termination voltage are not present (N in step S18), the controller 8 returns to step S14.

On the other hand, if a battery among the batteries 21a to 21c, 22a to 22c that reaches the discharge termination voltage is present (Y in step S18), the controller 8 determines whether all the batteries 21a to 21c. 22a to 22c reach the discharge termination voltage (step S19). If all the batteries 21a to 21c, 22a to 22c do not reach the discharge termination voltage (N in step S19), the controller 8 turns off the first switches SW11a to SW11c, SW21a to SW21c corresponding to the batteries 21a to 21c, 22a to 22c determined to have reached the discharge termination voltage, turns on the second switches SW12a to SW12c, SW22a to SW22c, bypasses the batteries 21a to 21c, 22a to 22c that reach the discharge termination voltage (step S20), and then returns to step S14.

When all the batteries 21a to 21c, 22a to 22c reach the discharge termination voltage (Y in step S19), the controller 8 disconnects the discharge from the load 10 (step S21), executes steps S10 and S11 in a similar manner as the charge processing, and ends the discharge processing.

According to the embodiment described above, the bidirectional DC/DC converters 61 and 62 are provided for each of the plurality of battery packs, and the ground terminal $T_{GND}$ and the first input-output terminal $T_1$ are connected to both ends of the corresponding battery packs 21 and 22. The positive electrodes of the battery packs 21 and 22 are connected to each other via the first input-output terminals $T_1$ and the second input-output terminals $T_2$. Accordingly, the bidirectional DC/DC converters 61 and 62 can boost and lower the total voltage of the battery packs 21 and 22 or the input voltage from the charger 40, and charge or discharge the plurality of battery packs 21 and 22 at the same time, thereby improving the efficiency of charging or discharging.

According to the embodiment described above, the controller 8 controls the outputs $V_{DC11}$ and $V_{DC12}$ so that the charge currents I1 and I2 in a predetermined range flow through the plurality of battery packs 21 and 22 during the charge. Accordingly, the plurality of battery packs 21 and 22 can be charged at the same time, and the charge can be performed more efficiently.

According to the embodiment described above, the controller 8 controls the outputs $V_{DC11}$ and $V_{DC12}$ to a value corresponding to the charging states of the plurality of battery packs 21 and 22 when the charge is started, and then controls the output from the first input-output terminal $T_1$ so that the charge currents I1 and I2 in the predetermined range flow through the plurality of battery packs 21 and 22. Accordingly, it is possible to rapidly make the charge currents I1 and I2 flow through the plurality of battery packs 21 and 22 when the charging is started.

According to the embodiment described above, the controller 8 controls the outputs $V_{DC21}$ and $V_{DC22}$ to have a predetermined value during the discharge. Accordingly, the plurality of battery packs 21 and 22 can be discharged at the same time, and the discharge can be performed more efficiently.

According to the embodiment described above, when the currents flowing through the plurality of battery packs 21 and 22 exceed an allowable maximum current during the discharge, the controller 8 controls the reductions of the DC/DC converters 61 and 62 so as to reduce the outputs $V_{DC21}$ and $V_{DC22}$. Accordingly, the discharge currents I1 and I2 flowing through the battery packs 21 and 22 can be reduced to be equal to or less than the allowable maximum current.

The present invention is not limited to the embodiment described above, and modifications, improvements, and the like can be made as appropriate. In addition, the material, shape, size, number, arrangement position or the like of each component in the above-described embodiment are optional and are not limited as long as the present invention can be achieved.

According to the embodiment described above, the controller 8 controls the outputs $V_{DC11}$ and $V_{DC12}$ based on the charging states of the battery packs 21 and 22 when the charge is started, and then controls the outputs $V_{DC11}$ and $V_{DC12}$ based on the charge currents I1 and I2, but the present invention is not limited thereto. The controller 8 may control the outputs $V_{DC11}$ and $V_{DC12}$ based on the charge currents I1 and I2 from the start of charging. As an example, the controller 8 may set the outputs $V_{DC11}$ and $V_{DC12}$ from the first input-output terminal $T_1$ to 0 when the charge is started, and increase the outputs $V_{DC11}$ and $V_{DC12}$ until the charge currents I1 and I2 fall within a predetermined range.

According to the embodiment described above, the switching units 41a to 41c, 42a to 42c include the first switches SW11a to SW11c, SW21a to SW21c, and the second switches SW12a to SW12c, SW22a to SW22c, but the present invention is not limited thereto. The switching units 41a to 41c, 42a to 42c may include a changeover switch for selecting one of the batteries 21a to 21c, 22a to 22c and a bypass circuit connected in parallel to the batteries 21a to 21c, 22a to 22c.

Figure 4:
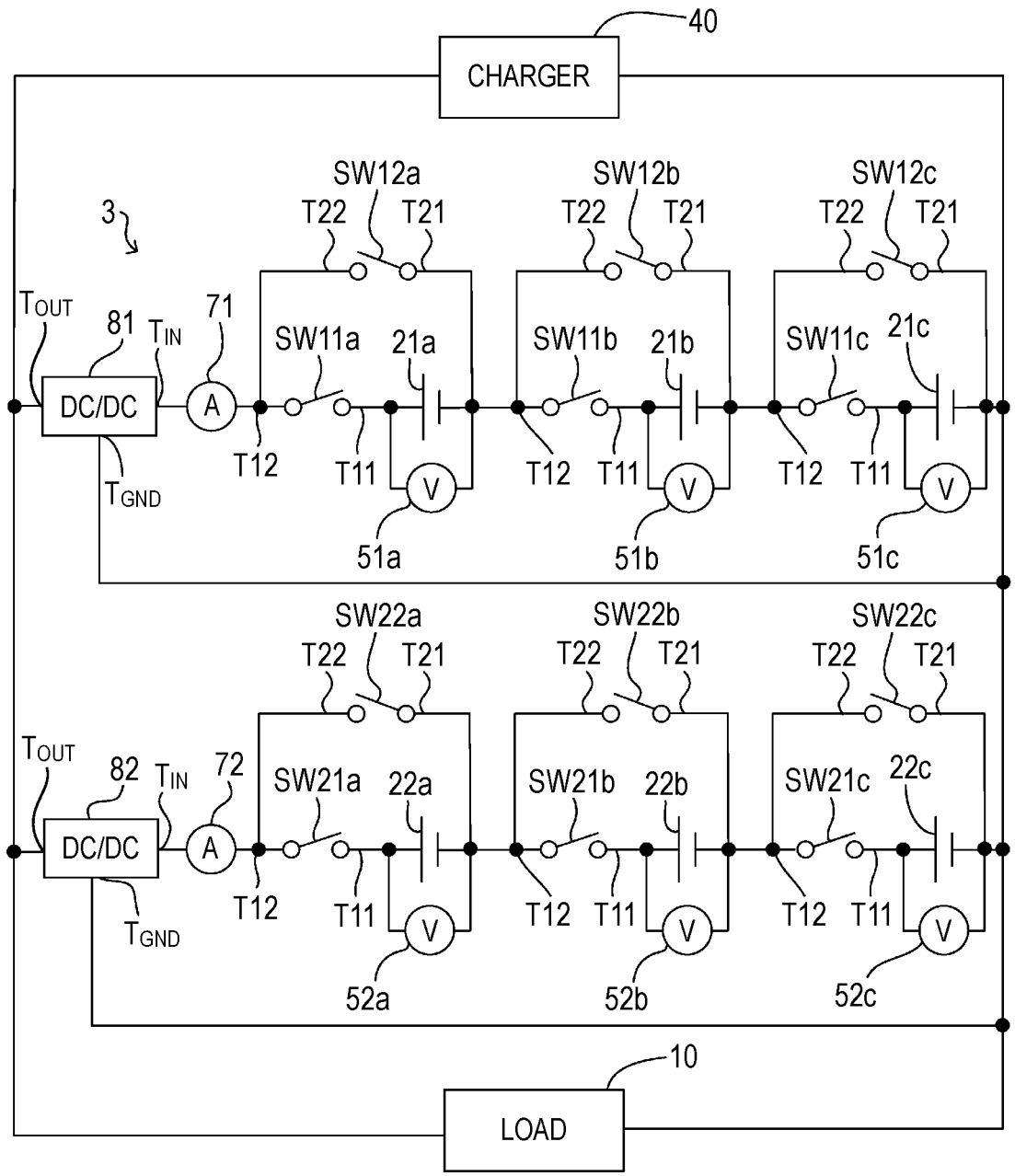
FIG. 4 is a circuit diagram showing a battery system according to another embodiment.
Figure 5:
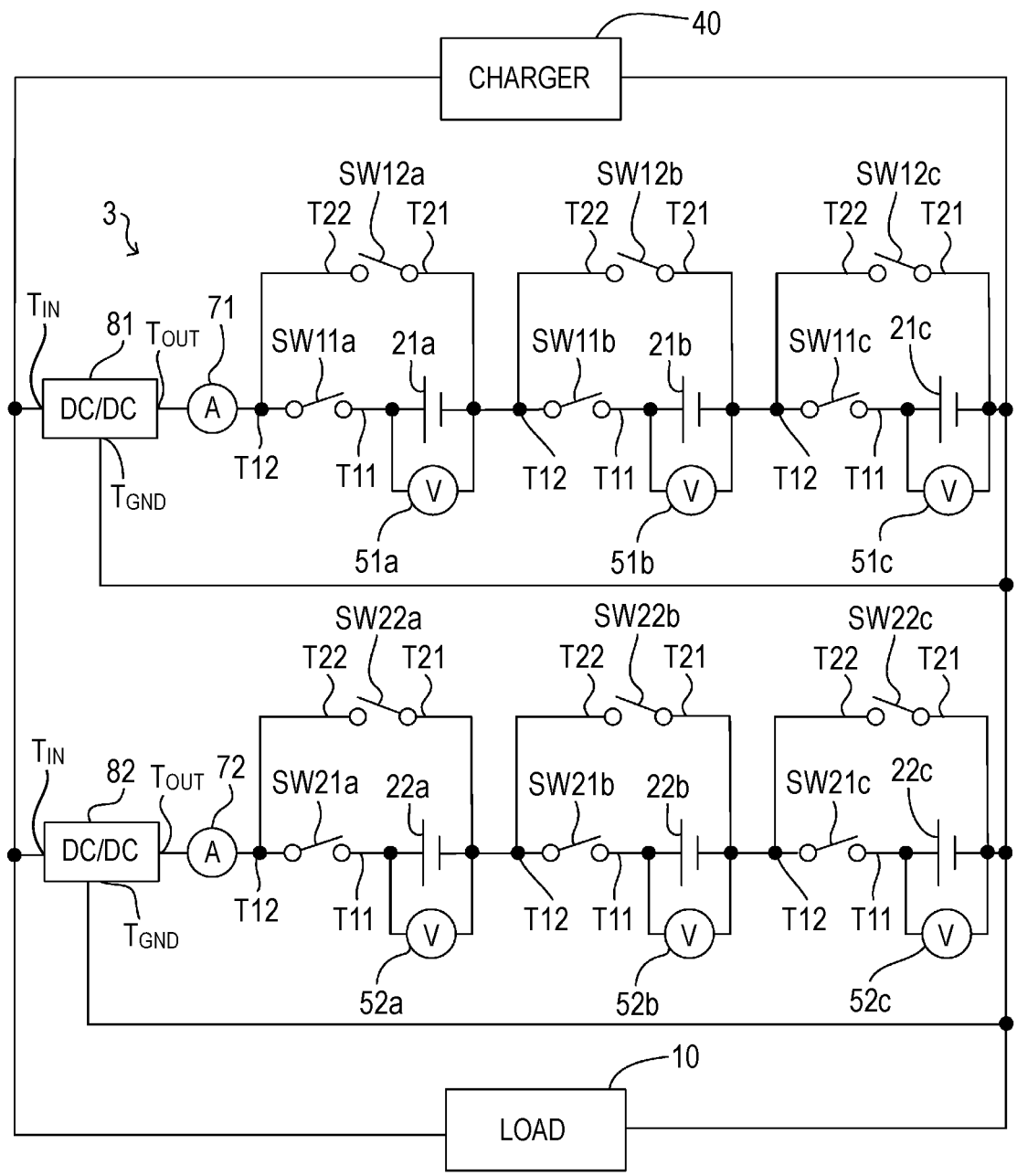
FIG. 5 is a circuit diagram showing a battery system according to another embodiment.

In addition, according to the embodiment described above, the bidirectional DDC converters 61 and 62 are provided for each of the battery packs 21 and 22, but the present invention is not limited thereto. As shown in FIGS. 4 and 5, instead of the bidirectional DC/DC converters 61 and 62, unidirectional DC/DC converters 81 and 82 (voltage converters) may be provided. The DC/DC converters 81 and 82 include a ground terminal $T_{GND}$, an input terminal $T_{IN}$, and an output terminal $T_{OUT}$, converts a voltage input between the ground terminal $T_{GND}$ and the input terminal $T_{IN}$ and outputs the converted voltage from the ground terminal $T_{GND}$ and the output terminal $T_{OUT}$.

In the example shown in FIG. 4, the ground terminal $T_{GND}$ and the input terminal $T_{IN}$ are connected to both ends of the battery packs 21 and 22, and one ends of the battery packs 21 and 22 are connected to each other via the input terminals $T_{IN}$ and the output terminals $T_{OUT}$. In the example shown in FIG. 4, the DC/DC converters 81 and 82 are controlled similarly as the bidirectional DC/DC converters 61 and 62 during the discharge according to the embodiment described above.

In the example shown in FIG. 5, the ground terminal $T_{GND}$ and the output terminal $T_{OUT}$ are connected to both ends of the battery packs 21 and 22, and one ends of the battery packs 21 and 22 are connected to each other via the input terminals $T_{IN}$ and the output terminals $T_{OUT}$. In the example shown in FIG. 5, the DC/DC converters 81 and 82 are controlled similarly as the bidirectional DC/DC converters 61 and 62 during the charge according to the embodiment described above.

The unidirectional DC/DC converters 81 and 82 shown in FIG. 4 and the unidirectional DC/DC converters 81 and 82 shown in FIG. 5 may be connected in parallel to perform voltage conversion in both directions.

In the embodiment described above, the DC/DC converters 61, 62, 81, and 82 are used as the voltage converters, but the present invention is not limited thereto. A series regulator may be used as the voltage converter.

Here, characteristics of the embodiment of the battery control unit and the battery system according to the present invention described above will be briefly summarized in the following [1] to [7].

[1] A battery control unit (3) includes:
a plurality of switching units (41a to 41c, 42a to 42c):
a first controller (8); and
a plurality of bidirectional voltage converters (61, 62) including a ground terminal ($T_{GND}$), a first input-output terminal ($T_1$), and a second input-output terminal ($T_2$), wherein each of a plurality of battery packs (21, 22) connected in parallel to each other includes a plurality of batteries (21a to 21c, 22a to 22c) connected in series with each other, wherein the plurality of switching units (41a to 41c, 42a to 42c) are disposed corresponding to the plurality of batteries (21a to 21c, 22a to 22c) respectively, and are configured to switch between a connected state where a corresponding battery (21a to 21c, 22a to 22c) among the plurality of batteries (21a to 21c, 22a to 22c) is connected in series with non-corresponding battery (21a to 21c, 22a to 22c) and a non-connected state where the corresponding battery (21a to 21c, 22a to 22c) is disconnected from series connection with the non-corresponding battery (21a to 21c, 22a to 22c), wherein the first controller (8) is configured to control the plurality of switching units (41a to 41c, 42a to 42c) corresponding to the battery (21a to 21c, 22a to 22c), which is determined to reach a termination voltage during charge or discharge, to the non-connected state, wherein the plurality of bidirectional voltage converters (61, 62) are configured to convert a first input voltage input between the first input-output terminal ($T_1$) and the ground terminal ($T_{GND}$) and output a first converted voltage from between the second input-output terminal ($T_2$) and the ground terminal ($T_{GND}$), and convert a second input voltage input between the second input-output terminal ($T_2$) and the ground terminal ($T_{GND}$) and output a second converted voltage from between the first input-output terminal ($T_1$) and the ground terminal ($T_{GND}$), wherein the plurality of bidirectional voltage converters (61, 62) are disposed corresponding to the plurality of battery packs (21, 22), and the first input-output terminals ($T_1$) are connected to one end of a corresponding battery pack (21 and 22) and the ground terminals ($T_{GND}$) are connected to another end of the corresponding battery pack (21 and 22), respectively, and wherein the one ends of the plurality of battery packs (21 and 22) are connected to each other via the first input-output terminals ($T_1$) and the second input-output terminals ($T_2$).

[2] The battery control unit (3) according to [1], wherein the battery control unit further includes a second controller (8) configured to control output voltages ($V_{DC11}$, $V_{DC12}$) from the first input-output terminals ($T_1$) of the plurality of bidirectional voltage converters (61, 62), and wherein the second controller (8) controls the output voltages ($V_{DC11}$, $V_{DC12}$) from the first input-output terminals ($T_1$) such that charge currents (I1, I2) in a predetermined range flow through the plurality of battery packs (21, 22) during the charge.

[3] The battery control unit (3) according to [2], wherein the second controller (8) controls the output voltages ($V_{DC11}$, $V_{DC12}$) from the first input-output terminals ($T_1$) to a value based on charging states of the plurality of battery packs (21, 22) when the charge is started, and controls the output voltages from the first input-output terminals ($T_1$) such that the charge currents in the predetermined range flow through the plurality of battery packs (21, 22).

[4] The battery control unit (3) according to [1], wherein the battery control unit further comprises a second controller (8) configured to control output voltages ($V_{DC21}$, $V_{DC22}$) from the second input-output terminals ($T_2$) of the plurality of bidirectional voltage converters (61, 62), and wherein the second controller (8) controls the output voltages ($V_{DC21}$, $V_{DC22}$) from the second input-output terminals ($T_2$) to a predetermined value during the discharge.

[5] The battery control unit (3) according to [4], wherein when a discharge current flowing through the battery pack (21, 22) exceeds a threshold value during the discharge, the second controller (8) is configured to control to reduce the output voltage ($V_{DC21}$, $V_{DC22}$) from the second input-output terminal ($T_2$) of the bidirectional voltage converter (61, 62) corresponding to the battery pack (21, 22) in which discharge current exceeds the threshold value.

[6] A battery control unit (3) includes:
a plurality of switching units (41a to 41c, 42a to 42c);
a first controller (8); and
a plurality of voltage converters (81, 82) including a ground terminal ($T_{GND}$), an input terminal ($T_{IN}$), and an output terminal ($T_{OUT}$)

wherein the plurality of switching units (41a to 41c, 42a to 42c) are disposed corresponding to the plurality of batteries (21a to 21c, 22a to 22c) respectively, and are configured to switch between a connected state where a corresponding battery (21a to 21c, 22a to 22c) among the plurality of batteries (21a to 21c, 22a to 22c) is connected in series with non-corresponding battery (21a to 21c, 22a to 22c) and a non-connected state where the corresponding battery (21a to 21c, 22a to 22c) is disconnected from series connection with the non-corresponding battery (21a to 21c, 22a to 22c), wherein the first controller (8) is configured to control the plurality of switching units (41a to 41c, 42a to 42c) corresponding to the battery (21a to 21c, 22a to 22c), which is determined to reach a termination voltage during charge or discharge, to the non-connected state, wherein the plurality of voltage converters (81, 82) are configured to convert a input voltage input between the input terminal ($T_{IN}$) and the ground terminal ($T_{GND}$) and output a converted voltage from between the output terminal ($T_{OUT}$) and the ground terminal ($T_{GND}$), wherein the voltage converters (81, 82) are disposed corresponding to the plurality of battery packs (21, 22), and the input terminals ($T_{IN}$) or the output terminals ($T_{OUT}$) are connected to one ends of a corresponding battery pack (21, 22), and the ground terminals ($T_{GND}$) are connected to another end of the corresponding battery pack (21 and 22), respectively, and wherein one ends of the plurality of battery packs (21, 22) are connected to each other via input terminals ($T_{IN}$) and output terminals ($T_{OUT}$).

[7] A battery system (1) includes:
a plurality of battery packs (21, 22) having a plurality of batteries (21a to 21c, 22a to 22c) connected in series, the plurality of battery packs (21, 22) being connected in parallel to each other; and
the battery control unit (3) according to any one of [1] to [6].

According to the battery control unit having the configuration of the above [1], the bidirectional voltage converter is provided for each of the plurality of battery packs, and the ground terminal and the first input-output terminal are connected to both ends of the corresponding battery pack. One ends of the battery packs are connected to each other via the first input-output terminals and the second input-output terminals. Accordingly, each bidirectional voltage converter boosts or lowers a total voltage of the battery pack or an input voltage input to the battery pack to allow the plurality of battery packs to be charged or discharged at the same time. Accordingly, it is possible to improve efficiency of charging or discharging.

According to the battery control unit having the configuration of the above [2], the second controller controls the output from the first input-output terminal such that the charge current in the predetermined range flows through the plurality of battery packs during the charge. Accordingly, the plurality of battery packs can be charged at the same time, and the charge can be performed more efficiently.

According to the battery control unit having the configuration of the above [3], the second controller controls the output from the first input-output terminal to the value corresponding to charging states of the plurality of battery packs when the charge is started, and then controls the output from the first input-output terminal such that the charge current in the predetermined range flows through the plurality of battery packs. Accordingly, it is possible to rapidly make the charge current flow through the plurality of battery packs when the charge is started.

According to the battery control unit having the configuration of the above [4], the second controller controls the output from the second input-output terminal to a predetermined value during the discharge. Accordingly, the plurality of battery packs can be discharged at the same time, and the discharge can be performed more efficiently.

According to the battery control unit having the configuration of the above [5], the second controller performs control so as to reduce the output from the second input-output terminal when the discharge current flowing through the plurality of battery packs exceeds the threshold value during the discharge. Accordingly, the discharge current flowing through the battery pack can be reduced to be equal to or less than the threshold value.

According to the battery control unit having the configuration of the above [6], the voltage converter is provided for each of the plurality of battery packs, and the ground terminal and one of the input terminal and the output terminal are connected to the both ends of the corresponding battery pack. One ends of the battery packs are connected to each other via the input terminals and the output terminals. Accordingly, each voltage converter boosts or lowers the total voltage of the battery pack or the input voltage input to the battery pack to allow the plurality of battery packs to be charged or discharged at the same time. Accordingly, it is possible to improve efficiency of charging or discharging.

According to the battery system having the configuration of the above [7], it is possible to improve efficiency of charging or discharging.

According to one or more embodiments, it is possible to provide a battery control unit and a battery system capable of improving efficiency of charging or discharging.

What is claimed is:

1. A battery control unit comprising:
a plurality of switching units;
a first controller; and
a plurality of bidirectional voltage converters including a ground terminal, a first, and a second input-output terminal,
wherein each of a plurality of battery packs connected in parallel to each other includes a plurality of batteries connected in series with each other,
wherein the plurality of switching units are disposed corresponding to the plurality of batteries respectively, and are configured to switch between a connected state where a corresponding battery among the plurality of batteries is connected in series with non-corresponding battery among the plurality of batteries and a non-connected state where the corresponding battery is disconnected from series connection with the non-corresponding battery,
wherein the first controller is configured to control the plurality of switching units corresponding to the battery, which is determined to reach a termination voltage during charge or discharge, to the non-connected state,
wherein the plurality of bidirectional voltage converters are configured to convert a first input voltage input between the first input-output terminal and the ground terminal and output a first converted voltage from between the second input-output terminal and the ground terminal, and convert a second input voltage input between the second input-output terminal and the ground terminal and output a second converted voltage from between the first input-output terminal and the ground terminal,
wherein the plurality of bidirectional voltage converters are disposed corresponding to the plurality of battery packs, and the first input-output terminals are connected to one end of a corresponding battery pack and the ground terminals are connected to another end of the corresponding battery pack, respectively, and wherein the one ends of the plurality of battery packs are connected to each other via the first input-output terminals and the second input-output terminals.

2. The battery control unit according to claim 1,
wherein the battery control unit further comprises a second controller configured to control output voltages from the first input-output terminals of the plurality of bidirectional voltage converters, and
wherein the second controller controls the output voltages from the first input-output terminals such that charge currents in a predetermined range flow through the plurality of battery packs during the charge.

3. The battery control unit according to claim 2,
wherein the second controller controls the output voltages from the first input-output terminals to a value based on charging states of the plurality of battery packs when the charge is started, and controls the output voltages from the first input-output terminals such that the charge currents in the predetermined range flow through the plurality of battery packs.

4. The battery control unit according to claim 1,
wherein the battery control unit further comprises a second controller configured to control output voltages from the second input-output terminals of the plurality of bidirectional voltage converters, and
wherein the second controller controls the output voltages from the second input-output terminals to a predetermined value during the discharge.

5. The battery control unit according to claim 4,
wherein when a discharge current flowing through the battery pack exceeds a threshold value during the discharge, the second controller is configured to control to reduce the output voltage from the second input-output terminal of the bidirectional voltage converter corresponding to the battery pack in which discharge current exceeds the threshold value.

6. A battery control unit comprises:
a plurality of switching units;
a first controller; and
a plurality of voltage converters including a ground terminal, an input terminal, and an output terminal,
wherein the plurality of switching units are disposed corresponding to the plurality of batteries respectively, and are configured to switch between a connected state where a corresponding battery among the plurality of batteries is connected in series with non-corresponding battery and a non-connected state where the corresponding battery is disconnected from series connection with the non-corresponding battery,
wherein the first controller is configured to control the plurality of switching units corresponding to the battery, which is determined to reach a termination voltage during charge or discharge, to the non-connected state,
wherein the plurality of voltage converters are configured to convert a input voltage input between the input terminal and the ground terminal and output a converted voltage from between the output terminal and the ground terminal,
wherein the voltage converters are disposed corresponding to the plurality of battery packs, and the input terminals or the output terminals are connected to one ends of a corresponding battery pack, and the ground terminals are connected to another end of the corresponding battery pack, respectively, and
wherein one ends of the plurality of battery packs are connected to each other via input terminals and output terminals.

7. A battery system comprises:
a plurality of battery packs having a plurality of batteries connected in series, the plurality of battery packs being connected in parallel to each other; and
the battery control unit according to claim 1.

8. A battery system comprises:
a plurality of battery packs having a plurality of batteries connected in series, the plurality of battery packs being connected in parallel to each other; and
the battery control unit according to claim 6.

\* \* \* \* \*